(No Model.) 3 Sheets—Sheet 1.
J. F. DORNFELD.
APPARATUS FOR MOISTENING AND ATTEMPERATING AIR.
No. 494,292. Patented Mar. 28, 1893.
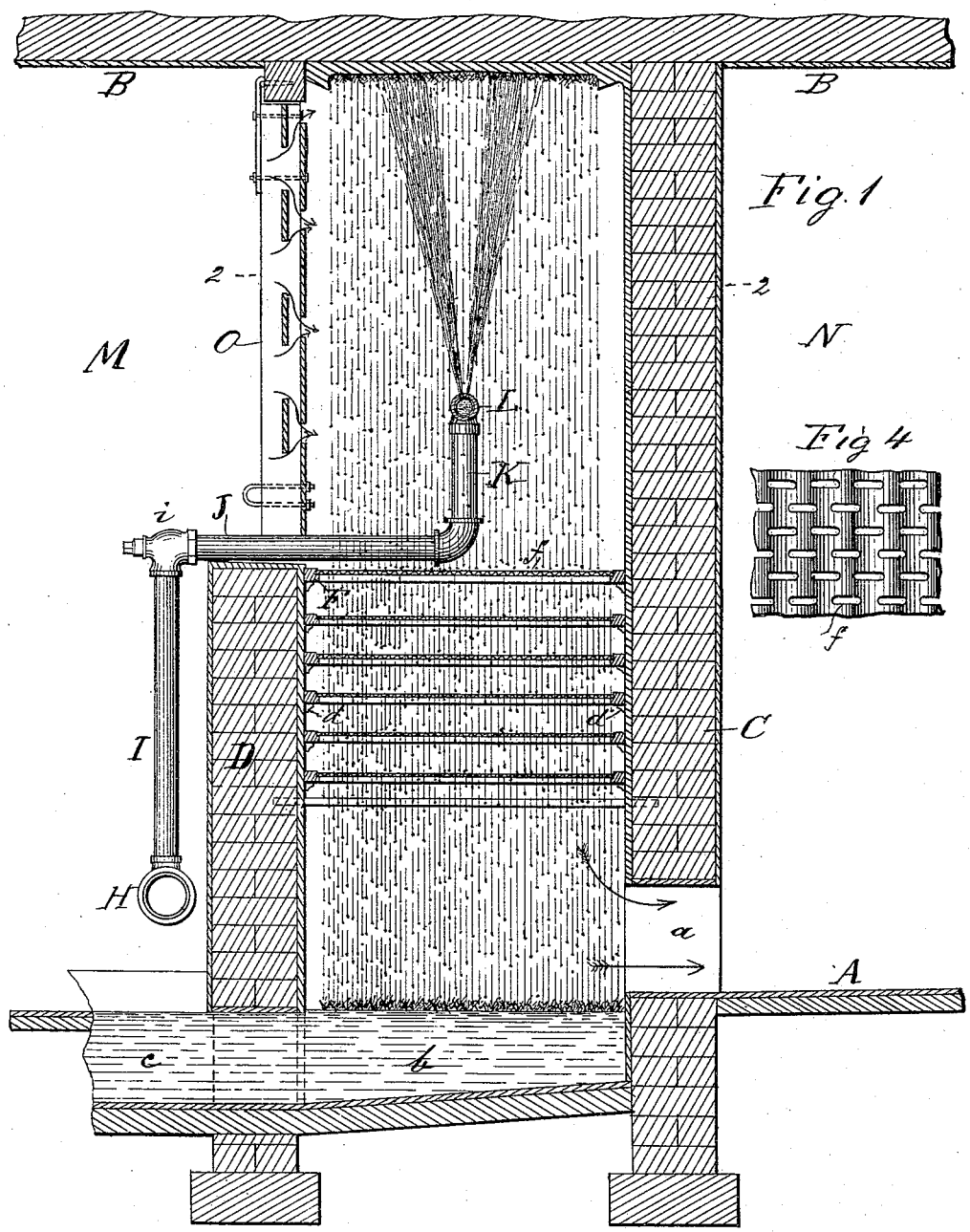

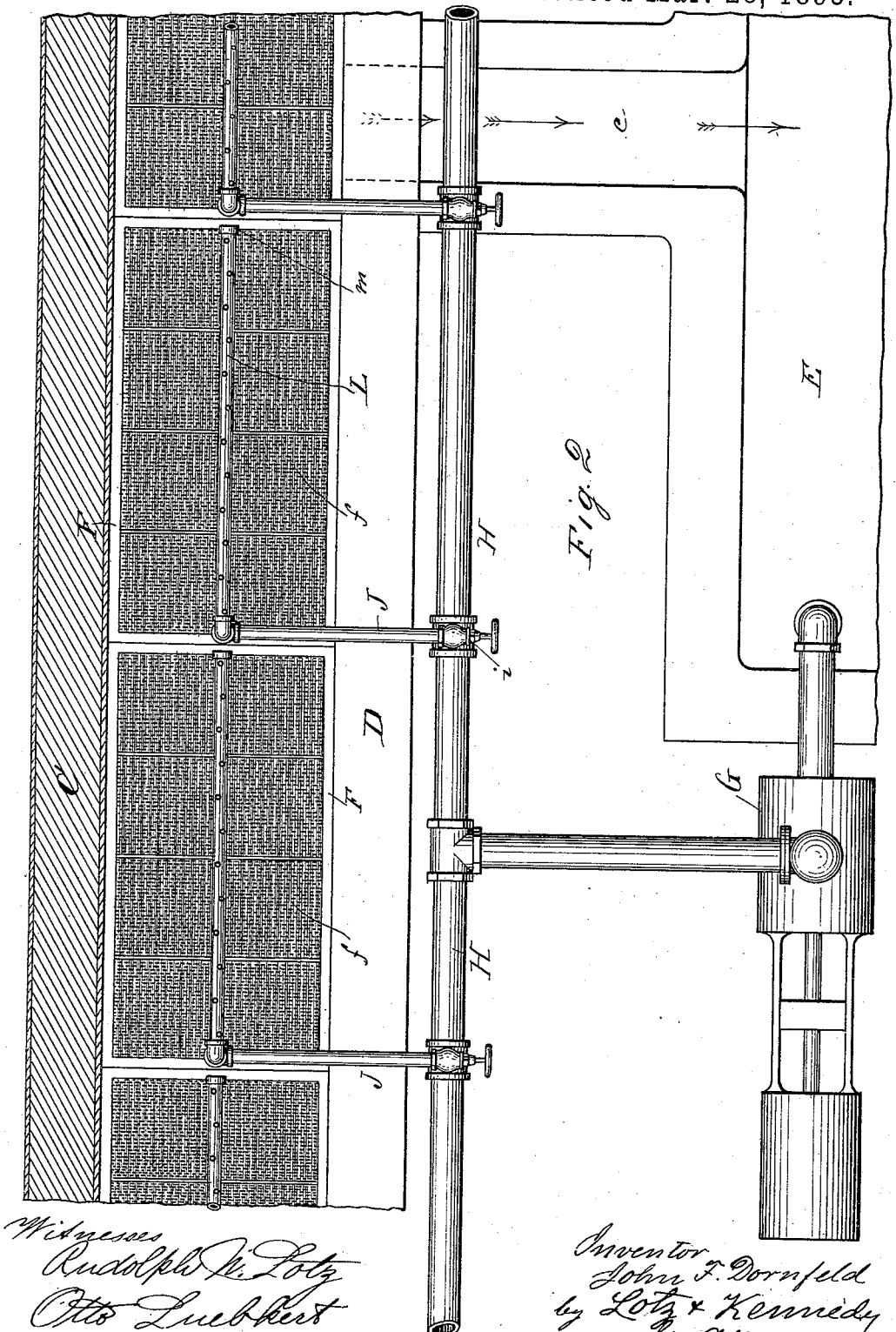

(No Model.)  3 Sheets—Sheet 3.
J. F. DORNFELD.
APPARATUS FOR MOISTENING AND ATTEMPERATING AIR.
No. 494,292. Patented Mar. 28, 1893.
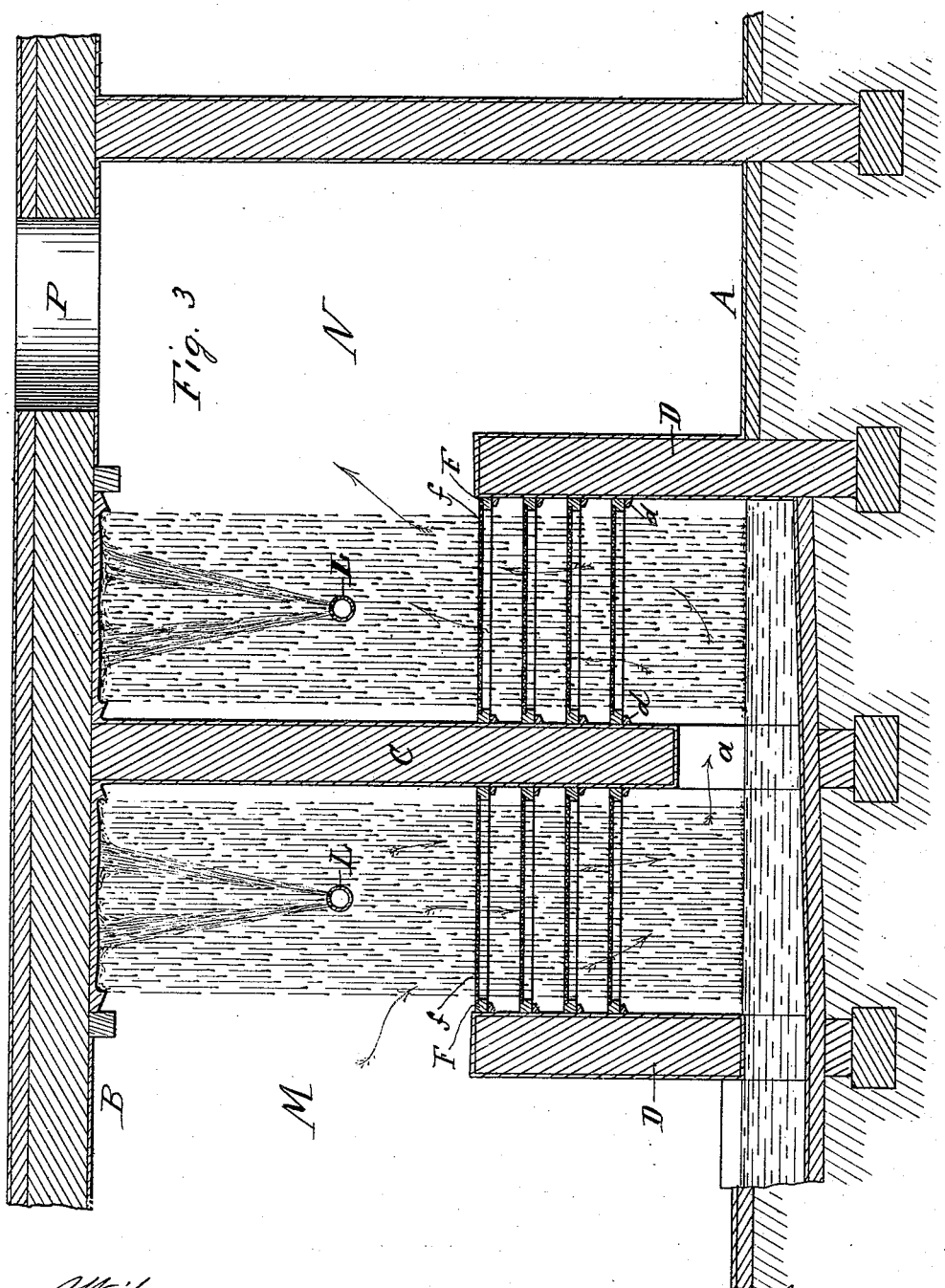

UNITED STATES PATENT OFFICE.

JOHN F. DORNFELD, OF WATERTOWN, WISCONSIN, ASSIGNOR TO THE SALADIN PNEUMATIC MALTING COMPANY, OF CHICAGO, ILLINOIS.

APPARATUS FOR MOISTENING AND ATTEMPERATING AIR.

SPECIFICATION forming part of Letters Patent No. 494,292, dated March 28, 1893.

Application filed May 28, 1892. Serial No. 434,795. (No model.)

*To all whom it may concern:*

Be it known that I, JOHN F. DORNFELD, a citizen of the United States, residing at Watertown, in the county of Jefferson and State of Wisconsin, have invented certain new and useful Improvements in Apparatus for Moistening and Attemperating Air; and I do hereby declare the following to be a full, clear, and exact description of the invention, such as will enable others skilled in the art to which it appertains to make and use the same.

My invention relates to devices and apparatus for purifying, attemperating and moistening air, which air thus prepared is of great value for ventilating beer vaults and fermenting rooms, and is particularly essential for the malting of grain by the pneumatic process, in which pure air is forced through a thick layer of steeped grain by means of blowers or exhaust fans. During the process of malting, the air so forced through the grain will furnish it the required amount of oxygen and will carry off the gases produced by the germination, principally being carbonic acid and nitrogen gases. It is essential that the air so forced through such grain be perfectly free of putrid matter and other impurities predisposing mold formation; that it be of such uniform temperature during all seasons of the year as is most favorable for a natural healthy growth of the grain, and that it be impregnated with moisture to its full capacity, so that passing through the grain, the moisture carried with the air will compensate for the moisture evaporated from the grain by the ventilation. Many devices and apparatuses have been constructed heretofore for accomplishing this object, such as towers filled with coke with a spray of water arranged to trickle down between the coke while the air was forced up through this coke and again large cylinders, having multiple peripherally perforated shells of sheet metal which dip into a basin of water while being rotated for the air to pass through the perforations of the thus wetted shells. Apparatus of the above construction however are very difficult to clean of the slimy matter adhering and accumulating therein. Other devices again, such as vertical sheets of wire screen or perforated metal have been applied and kept wet by a spray from above while the air was forced through said sheets, but with these the difficulty has been to keep the sheets uniformly moistened over their entire surface during the operation.

The object of this my invention is to provide an apparatus that will overcome all the heretofore experienced difficulties and objections, and to be very simple in its construction and under ready control and easy to clean, and it consists of the novel devices and combinations of devices hereinafter described and specifically claimed.

In the accompanying drawings, Figure 1 represents a transverse vertical section of the apparatus; Fig. 2 a sectional plan on line 2—2 in Fig. 1; Fig. 3 a transverse vertical section of the apparatus built on a duplicate system as may be desirable in extremely warm or cold climates and Fig. 4 represents a portion of the perforated sheet metal preferably used in this apparatus.

Corresponding referential letters in the several figures of the drawings designate like parts.

A denotes the floor and B the ceiling or deflecting plate of the cellar or room in which the apparatus is to be erected.

C is a wall extending from floor to ceiling with air openings $a$ near its base and D is an auxiliary wall extending from floor vertically about half the height, and between these two walls is provided a water receptacle or channel $b$, communicating through an opening in wall D and by a channel $c$ with a reservoir E in the floor of the room.

The inside faces of the walls C and D are provided with projecting brackets or narrow shelves $d$ for removably supporting wooden sash or frames F, each carrying a wire screen or perforated sheet metal panel $f$, secured in such frame in any suitable manner. These frames or sash are placed horizontally, six (more or less) one above the other with a sufficient open space between, while longitudinally the frames F of the several series closely adjoin each other. The said frames moreover have practically air-tight connections with said walls, for the purpose of compelling the air to pass therethrough.

G is a pump drawing water from reservoir

E and forcing it into main pipe H having vertical branches I each with a regulating valve *i*, whence each branch I is continued by a horizontal pipe J reaching over the center between the two walls C and D or over the center of frames F whence again it is continued vertically by a short pipe K connecting with one end of a longitudinally horizontal pipe L. These pipes L are closed on their opposite ends by screw plugs or caps *m* to be removable for cleaning said pipe, while in its top side each pipe L is perforated with a series of small holes placed alternately on oppositely angular positions, so that the water jets issuing from these perforations will have upwardly flaring directions. These jets striking the ceiling with force will scatter and will then drop down from the ceiling in a spray like rain upon the upper screen or perforated plate *f* of frame F and thence the water will trickle through the perforations from screen to screen until discharging into channel *b* to flow back into reservoir E. By this arrangement all the sheets or plates *f* are continuously kept covered with water.

The fresh air forced by a pressure fan may enter either room M to pass through the perforations of the several sheets or plates *f* in a downward direction and escape through openings *a* into room N, or the fresh air may be forced into room N to pass upward through the perforations in sheets or plates *f*, when in either case the prolonged contact of such air with the water and with the sheets or plates cooled or warmed by the water, it will be attemperated to the desired degree of temperature, will be washed or cleaned of its impurities which will be retained by the water, and will be impregnated with moisture to its full capacity thus to be in proper condition for the intended purposes of ventilating.

Blind slatted partitions O are removably secured between the top of wall D and the ceiling to retain the sprayed water within the space above sheets or plates *f* and at the same time to subdivide the forced air to enter in a series of currents.

The reservoir E may have in its bottom a steam coil for heating the water in winter time and a refrigerator coil for cooling the water in summer time and it should also have a supply for fresh water and an overflow for the surplus water all of which I do not claim as new and therefore I have not shown in the drawings.

For extreme climates the apparatus can be duplicated as shown by Fig. 3 directing the air downward through the perforated plates at one side and again upward through the perforated plates at the opposite side of wall C and finally to be directed under or into the malting apparatus through opening P.

The sheets or plates *f* for the water and air to pass through may either be wire screens, or perforated sheet metal and may be either straight or corrugated, as shown by Fig. 4, or when made of sheet metal the metal around each perforation may be raised or sunk or raised and sunk in alternate order.

I claim as my invention—

1. In a device of the kind specified, the combination substantially as hereinbefore set forth, with a plurality of screens or perforated plates horizontally arranged within a chamber unobstructed above and below said screens or plates, said screens or plates having practically air-tight connections with the sides of said chamber of openings for the passage of air communicating with said chamber above and below said screens or perforated plates, a water supply pipe or passage located above said screens or perforated plates for supplying water thereto, and a trough or receptacle to receive such water after passing through said perforated plates or screens.

2. In a device of the kind specified, the combination substantially as hereinbefore set forth, with a plurality of screens or perforated plates horizontally arranged within a chamber unobstructed above and below said screens or plates, said screens or plates having practically air-tight connections with the sides of said chamber, of openings for the passage of air communicating with said chamber above and below said screens or perforated plates, a water supply pipe or passage located above said screens or perforated plates and having openings on its upper side for the escape of water therefrom, and a trough or receptacle to receive such water after passing through said plates or screens.

3. In a device of the kind specified, the combination substantially as hereinbefore set forth, with a plurality of screens or perforated plates horizontally arranged within a chamber unobstructed above and below said screens or plates, said screens or plates having practically air-tight connections with the sides of said chamber, of openings for the passage of air communicating with said chamber above and below said screens or perforated plates, a water supply pipe or passage located above said screens or perforated plates and having openings on its upper side for the escape of water therefrom, a deflecting plate located above the same, and a trough or receptacle to receive such water after passing through said plates or screens.

4. In a device of the kind specified, the combination substantially as hereinbefore set forth, with a plurality of corrugated screens or perforated plates horizontally arranged within a chamber and having practically air-tight connections with the sides thereof, of openings for the passage of air communicating with said chamber above and below said screens or perforated plates, a water supply pipe or passage located above said screens or perforated plates for supplying water thereto, and a trough or receptacle to receive such water after passing through said perforated plates or screens.

5. In a device of the kind specified, the combination substantially as hereinbefore set forth, with a plurality of screens or perforated plates horizontally arranged within a chamber and having practically air-tight connections with the sides thereof, an opening communicating with said chamber above said screens or perforated plates and provided with blind slatted partitions O, an opening in the side of said chamber below said screens or perforated plates, a water supply pipe or passage located above said screens or perforated plates for supplying water thereto, and a trough or receptacle to receive such water after passing through said screens or perforated plates.

In testimony whereof I affix my signature in presence of two witnesses.

JOHN F. DORNFELD.

Witnesses:
PAUL WESSINGER,
C. F. PFLUGER.

It is hereby certified that the assignee, "The Saladin Pneumatic Malting Company," in Letters Patent No. 494,292, granted March 28, 1893, upon the application of John F. Dornfeld, of Watertown, Wisconsin, for an improvement in "Apparatus for Moistening and Attemperating Air," should have been described and specified as *The Saladin Pneumatic Malting Construction Company;* and that the said Letters Patent should be read with this correction therein that the same may conform to the record of the case in the Patent Office.

Signed, countersigned, and sealed this 25th day of April, A. D. 1893.

[SEAL.]

JNO. M. REYNOLDS,
*Assistant Secretary of the Interior.*

Countersigned:
    JOHN S. SEYMOUR,
        *Commissioner of Patents.*